United States Patent
Bates et al.

(10) Patent No.: US 6,930,707 B2
(45) Date of Patent: Aug. 16, 2005

(54) DIGITAL CAMERA APPARATUS WITH BIOMETRIC CAPABILITY

(75) Inventors: Cary Lee Bates, Rochester, MN (US); Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 09/746,816

(22) Filed: Dec. 22, 2000

(65) Prior Publication Data

US 2002/0080256 A1 Jun. 27, 2002

(51) Int. Cl.[7] .......................... H04N 7/18; H04N 5/225; G02B 13/16; G06K 9/00
(52) U.S. Cl. .......................... 348/78; 348/161; 348/335; 382/117
(58) Field of Search .............................. 348/207.99, 78, 348/161, 231.99, 231.1–231.3, 335–344, 369; 382/117; 396/18

(56) References Cited

U.S. PATENT DOCUMENTS

| | | | | |
|---|---|---|---|---|
| 5,467,403 A | * | 11/1995 | Fishbine et al. | 382/116 |
| 5,486,892 A | * | 1/1996 | Suzuki et al. | 396/51 |
| 5,579,079 A | * | 11/1996 | Yamada et al. | 396/51 |
| 5,987,155 A | * | 11/1999 | Dunn et al. | 382/116 |
| 6,035,054 A | * | 3/2000 | Odaka et al. | 382/117 |
| 6,433,818 B1 | * | 8/2002 | Steinberg et al. | 348/161 |
| 6,590,608 B2 | * | 7/2003 | Matsumoto et al. | 348/231.2 |

* cited by examiner

*Primary Examiner*—Wendy R. Garber
*Assistant Examiner*—Kelly L. Jerabek
(74) *Attorney, Agent, or Firm*—Roy W. Truelson

(57) ABSTRACT

A digital camera contains biometric capability to identify a photographer, which is preferably provided by the camera's own optical sensors. The biometric feature is preferably the iris of a photographer's eye, which is recognized as unique for each individual. The camera captures an image of an iris, abstracts a set of distinguishing features, and matches this set to an on-board database. The iris image is preferably captured when the photographer brings his eye in the vicinity of the camera's viewing window, through a combination of mirrors, lenses, prisms, and the like. This capability may be used to record the identity of a photographer with the image, as an anti-theft or privacy device, or to personalize the camera settings.

7 Claims, 11 Drawing Sheets

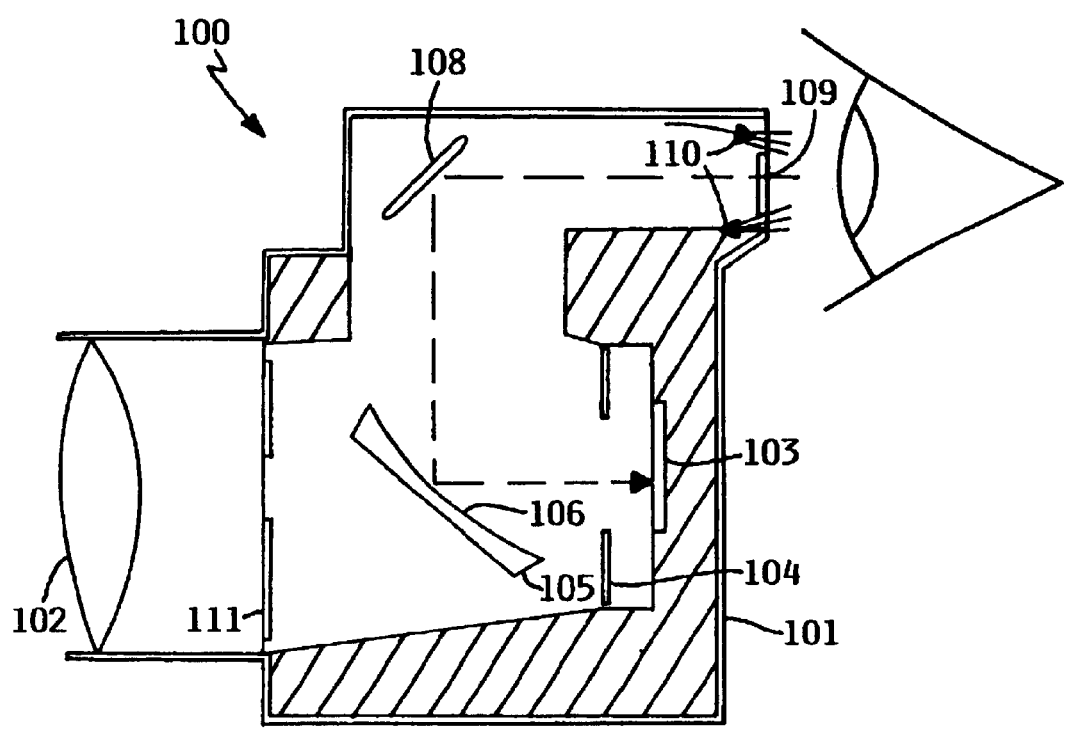
FIG. IA

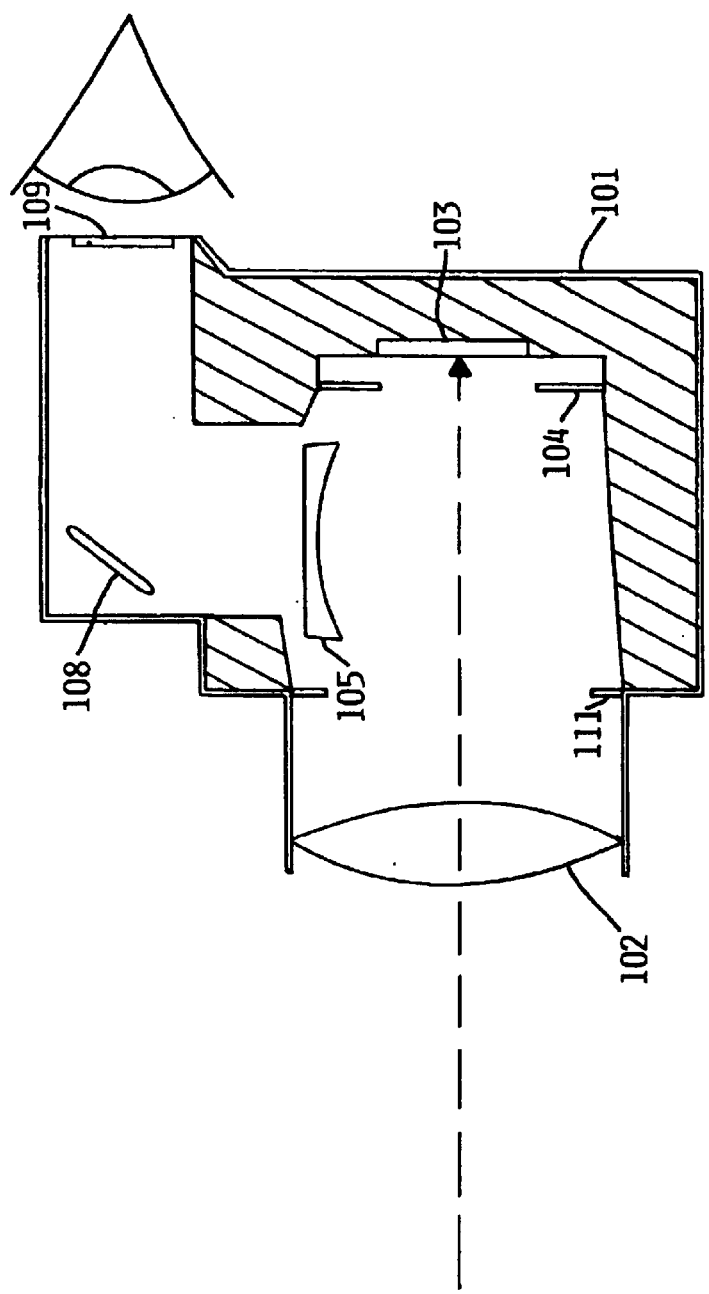
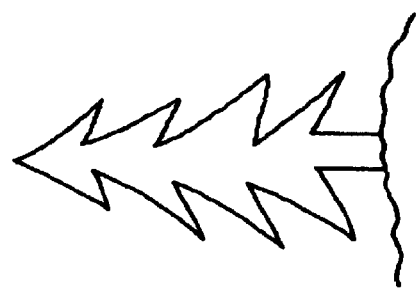
FIG. IC

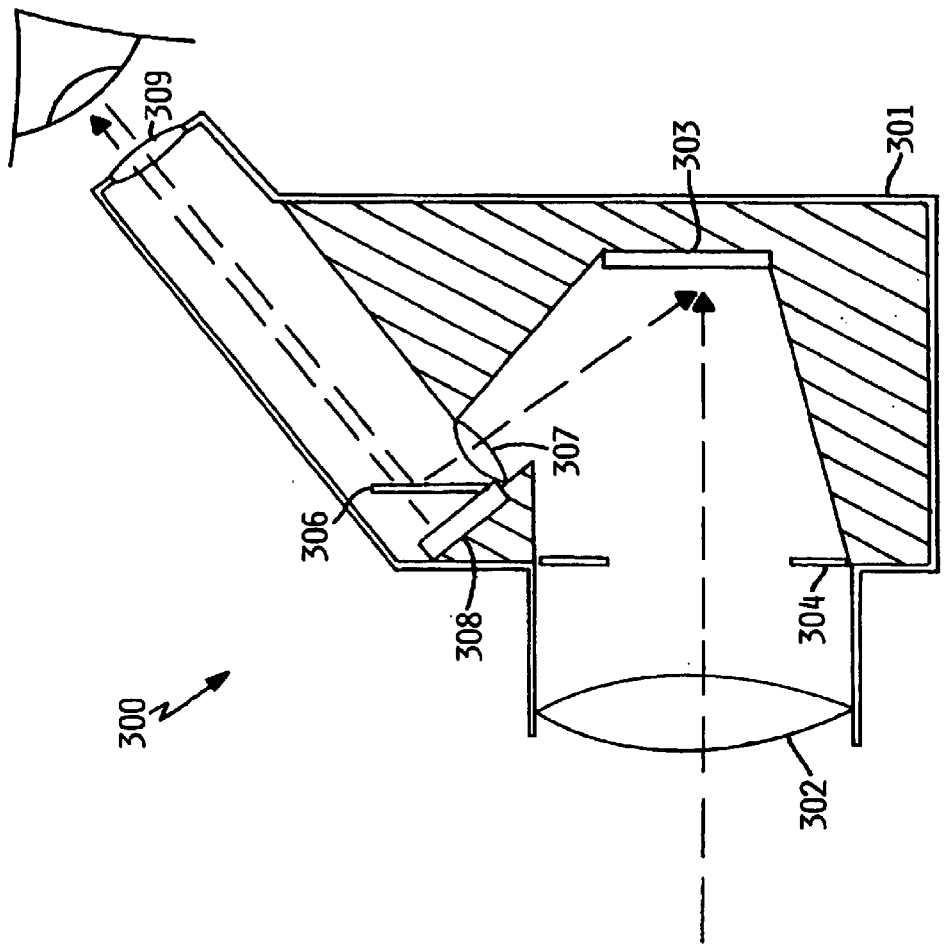
FIG. 3
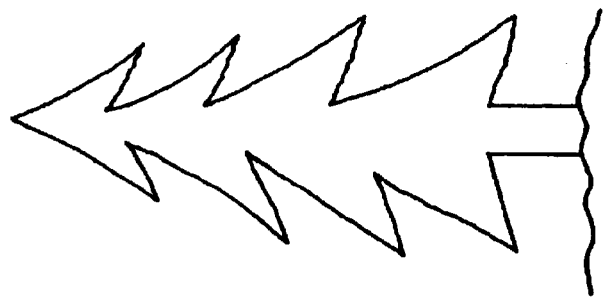

DIGITAL CAMERA APPARATUS WITH BIOMETRIC CAPABILITY

FIELD OF THE INVENTION

The present invention relates to digital data devices, and in particular to digital cameras, motion video, and similar devices which digitally capture optical images.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The declining prices and expanding capabilities of modem digital technology has caused it to be used in an ever increasing variety of applications. One of these applications has been the capturing of optical images. Optical imaging technology generally uses a digital sensor array, such as a charge-coupled device (CCD) array, having a large number of photosensitive elements arranged in a regular pattern, and appropriate supporting hardware which scans the output of the elements and constructs therefrom a digital image. The digital image can then be stored in any digital data storage medium, displayed on a digital display device, printed on paper or other medium, manipulated using editing tools, or transmitted to remote locations using any transmission medium appropriate for digital data.

Optical imaging has been used in a variety of settings, including fax machines, document scanners, bar code readers, and so forth. In particular, digital optical imaging is also used as a substitute for older film-based media in high-resolution still and motion picture cameras. Indeed, as digital optical technology improves in quality and declines in price, many foresee the day when it will completely supplant the older film-based media in these fields.

A digital camera, whether still or motion video, typically contains an on-board processor, which can be programmed to perform a variety of functions. Among other things, the processor can be programmed to embed supplementary information in the digital image. It is well known, for example, to embed a date and time at which the image was captured. Date and time is easily established by maintaining an on-board digital clock in the camera. Other information might be useful, but is not so easily obtained.

Most digital cameras to date have simply tried to mimic the capabilities of their mechanical device counterparts, making limited use of digital technologies other than simple optical scanning and recording. Such an approach fails to recognize the vast potential of the information age to provide improved integration of digital technology and enhanced function of digital cameras not yet conceived, a potential which is bounded only by human imagination.

SUMMARY OF THE INVENTION

A digital camera contains biometric capability to identify an individual photographer. Specifically, it is preferred that this biometric capability be provided by the camera's own optical imaging capability, which obtains an image of some distinguishing feature of the photographer, and matches it to an on-board database of such features to identify the individual.

In the preferred embodiment, the distinguishing feature is the iris of a photographer's eye. It is recognized that, like fingerprints, an iris contains numerous distinguishing features and patterns which can be abstracted from an image to develop a unique identification. Not only are the irises of any two people different, but the two irises of any individual differ from each other. The camera's digital sensor captures an image of a photographer's iris, abstracts a set of distinguishing features from the image, compares this set to a stored set of distinguishing features of known irises, and if possible, matches the photographer's features to one in the stored set.

In the preferred embodiment, a combination of mirrors, lenses, prisms or other optical devices focuses light from the iris to capture its image as the photographer's eye is placed in the vicinity of a viewing window for viewing the object to be photographed. Once the photographer's iris is recorded, these optical devices alter their configuration so that the viewing window functions in a conventional manner. Alternatively, it would be possible for the photographer to look directly into the lens of the camera to register his iris before obtaining still or motion video.

Preferably, the camera may be programmed to use photographer identifying information in any of several modes, alone or in combination. The identity of the photographer may be automatically recorded with the recorded digital image (still photograph or motion video). Identity may be simply a photographer name; alternatively, the identity may be a digital signature derived from the biometric information, which would be difficult to alter and thus could be used to validate ownership of video images. Additionally, verifying the identify of a photographer may be used as an anti-theft or anti-tampering device, wherein one or more functions of the camera is disabled unless the identity matches one in the database. Disabling function may, e.g., mean preventing the capture of an image, or may mean preventing an image previously captured from being output to another device for printing, storage, and the like. Finally, individual photographers may record individual default preferences for camera settings. Upon determining the identity of a photographer, the camera could set itself to previously defined default settings associated with the particular photographer.

A digital camera as described herein provides an enhanced record supplementing its recorded digital images, provides a greater degree of protection from theft and loss of privacy, and provides greater ease of use among multiple individuals.

The details of the present invention, both as to its structure and operation, can best be understood in reference to the accompanying drawings, in which like reference numerals refer to like parts, and in which:

BRIEF DESCRIPTION OF THE DRAWING

FIGS. 1A–1C are sectional views representing different operational configurations of a digital camera according to a first embodiment of the present invention.

FIG. 3 is a sectional view representing a configuration of a digital camera according to a third embodiment of the present invention.

DETAILED DESCRIPTION OF THE PREFERRED EMBODIMENT

In accordance with the present invention, a biometric parameter is obtained from the photographer. In the preferred embodiment, this biometric measurement is an optical image of the iris of one of the photographer's eyes. This image may be obtained in many possible ways, a sample of which are shown and described herein.

Figure 4:
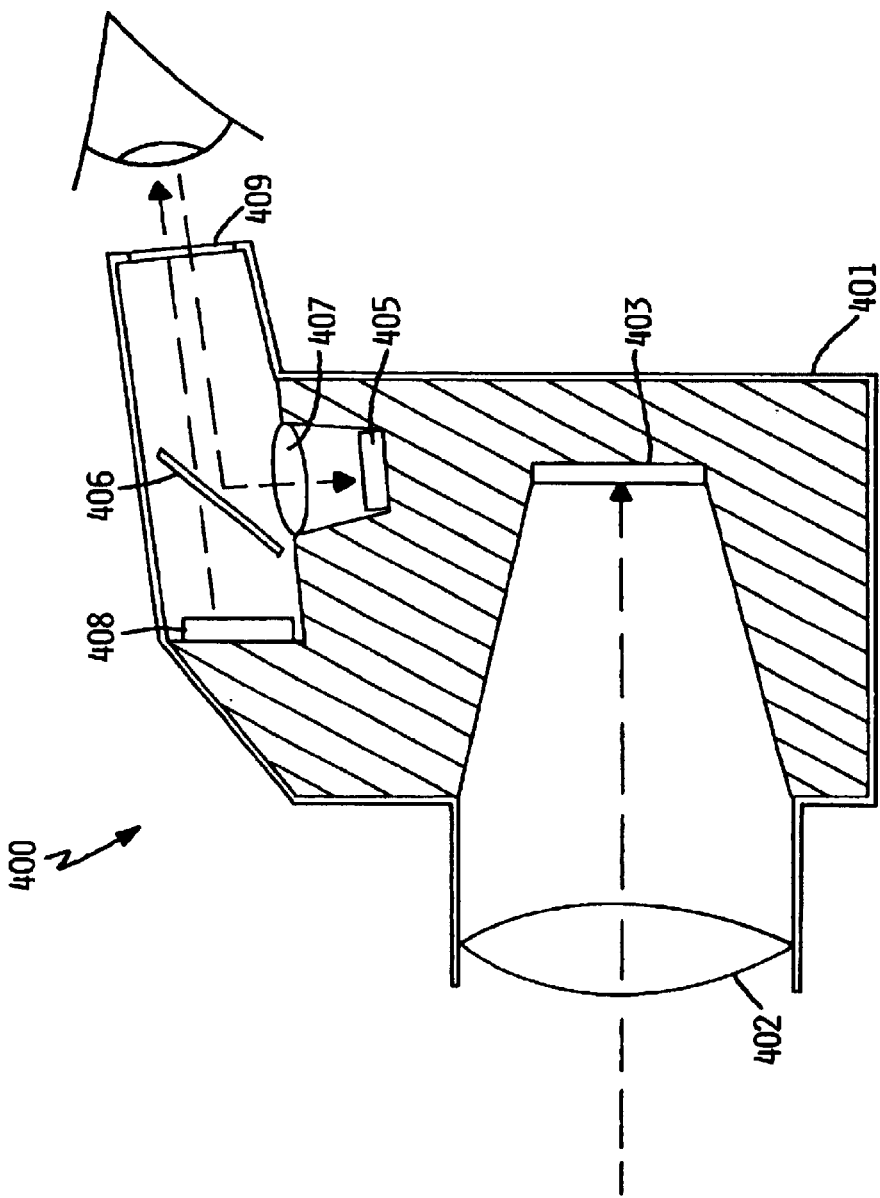
FIG. 4 is a sectional view representing a configuration of a digital camera according to a fourth embodiment of the present invention.
Figure 4:
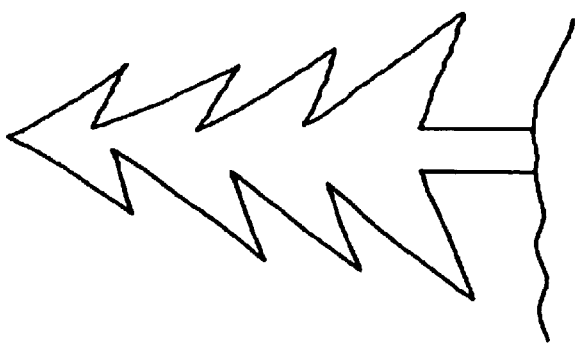

Preferably, an image of the photographer's iris is taken using the same optical sensors that are used for photographing an object of interest to the photographer. FIGS. 1–3 and 5 illustrate four different embodiments of this concept. Alternatively, a separate sensor may obtain the image of the iris, as shown in FIG. 4.

Figure 1B:
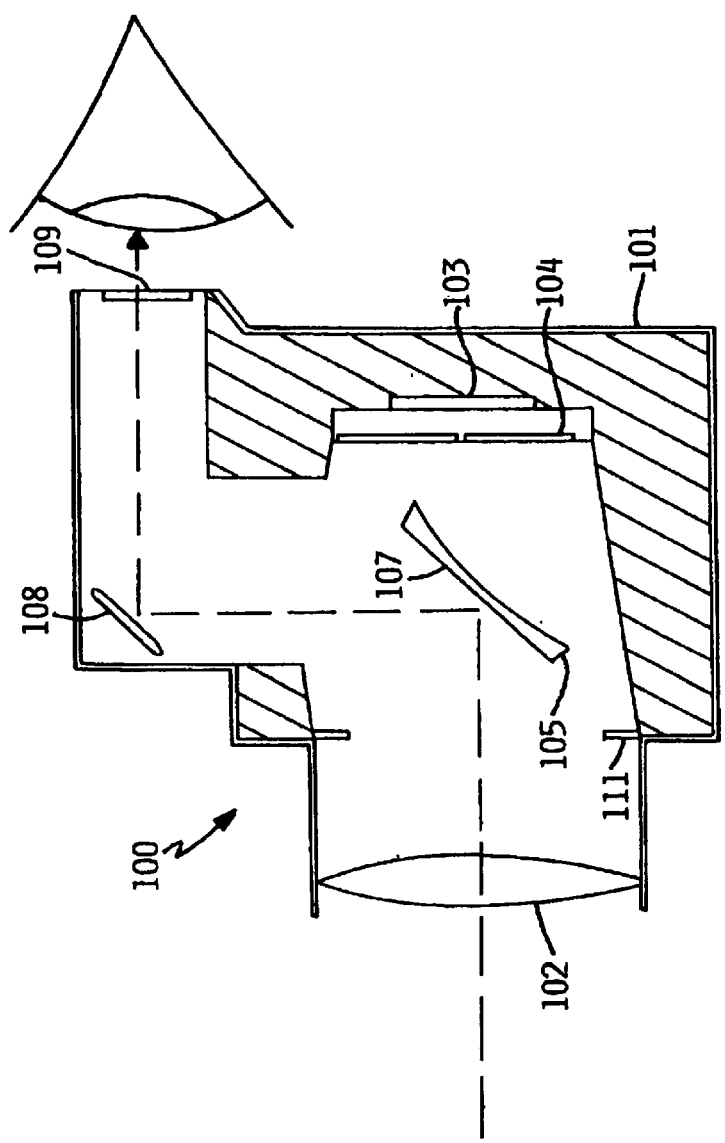
Figure 1B:
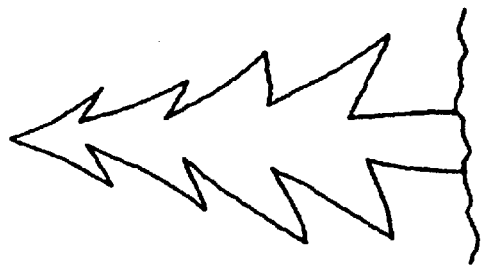

FIGS. 1A–1C are sectional views of different operational configurations of a digital camera according to a first embodiment. In this embodiment, camera 100 contains a single-lens-reflex (SLR) mechanism, wherein a single lens is used for both viewing an object of interest to be photographed, and for capturing light from the object on an optical sensor array. Camera 100 includes a body or housing 101, lens 102, optical sensor array 103, shutter 104, and deflection mirror 105. FIG. 1B shows the configuration of camera 100 when the photographer is viewing the object of interest, represented as a tree, which is generally done to establish the correct setting prior to taking the photograph. In this configuration, shutter 104 is closed, and deflection mirror 105 presents surface 107 (usually a flat surface) at an angle to incoming light passing through lens 102. Light is deflected upwards, striking mirror 108, which directs it through view window 109 to the eye of the photographer. As depicted in FIG. 1C, when the photographer takes a photograph, the single lens reflex mechanism simultaneously moves deflecting mirror 105 upward and out of the way of incoming light, and opens shutter 104, allowing light passing through lens 102 to register on optical sensor array 103, which captures an optical image. The light path as a dashed line in the figures.

A third configuration of camera 100 is possible, as represented in FIG. 1A. In this configuration, deflecting mirror is rotated approximately 90 degrees from the configuration of FIG. 1B, and shutter 104 is opened. This enables light traveling in a direction opposite that shown in FIG. 1B to come from the eye of the photographer, pass through view window 109, be deflected downward by mirror 108, and strike surface 106 of deflecting mirror 105, which directs it toward optical sensor array 103. Surface 106 may be a curved surface to focus the light on sensor array 103, thus performing the function that is normally performed by lens 102.

In the configuration of FIG. 1A, low-speed door 111 is closed to prevent light passing through lens 102 from registering on the optical array 103 when attempting to capture the photographer's iris. In the configurations of FIGS. 1B and 1C, low speed door 111 is open. Door 111 is not a true shutter which requires synchronized, high speed operation, but may be implemented as anything which blocks extraneous light during registration of the iris. E.g., low-speed door 111 could be operated automatically by the camera's processor, or could be manually operated. It could be a separate door with no other function, or it could be implemented as a variable opening aperture, in which one of the aperture settings is complete closure, or it could be something so simple as a manually removable lens cap. Optional illumination of the photographer's iris may be provided by illuminators 110, which may, e.g., be light emitting diodes (LEDs).

Figure 2A:
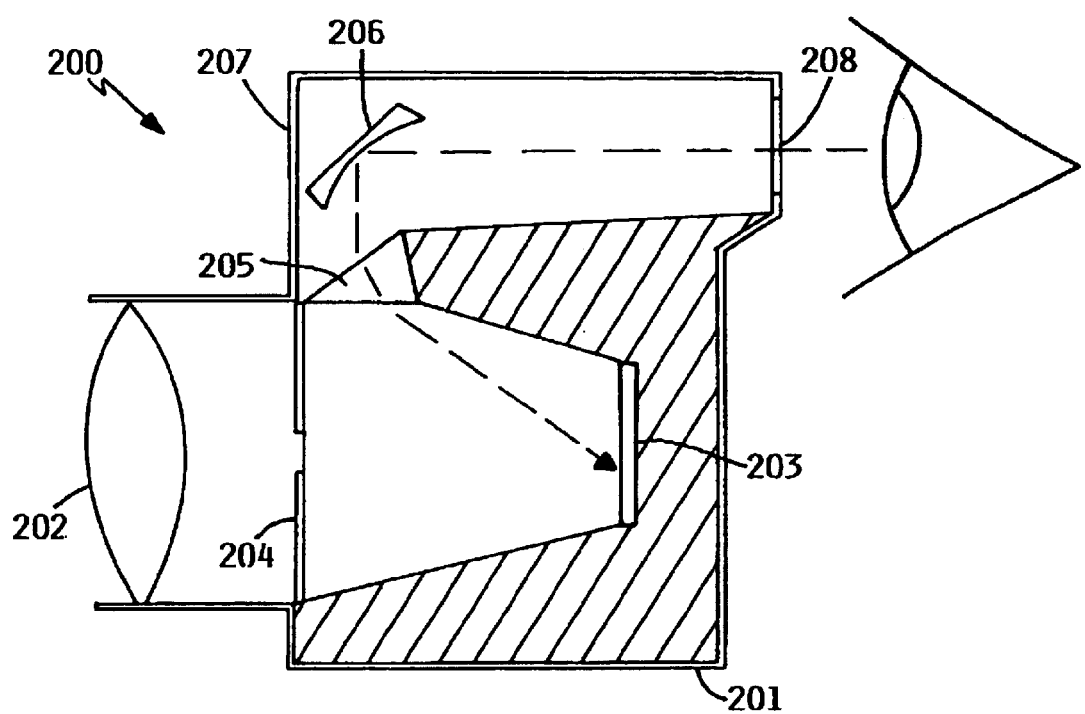
FIGS. 2A–2B are sectional views representing different operational configurations of a digital camera according to a second embodiment of the present invention.
Figure 2B:
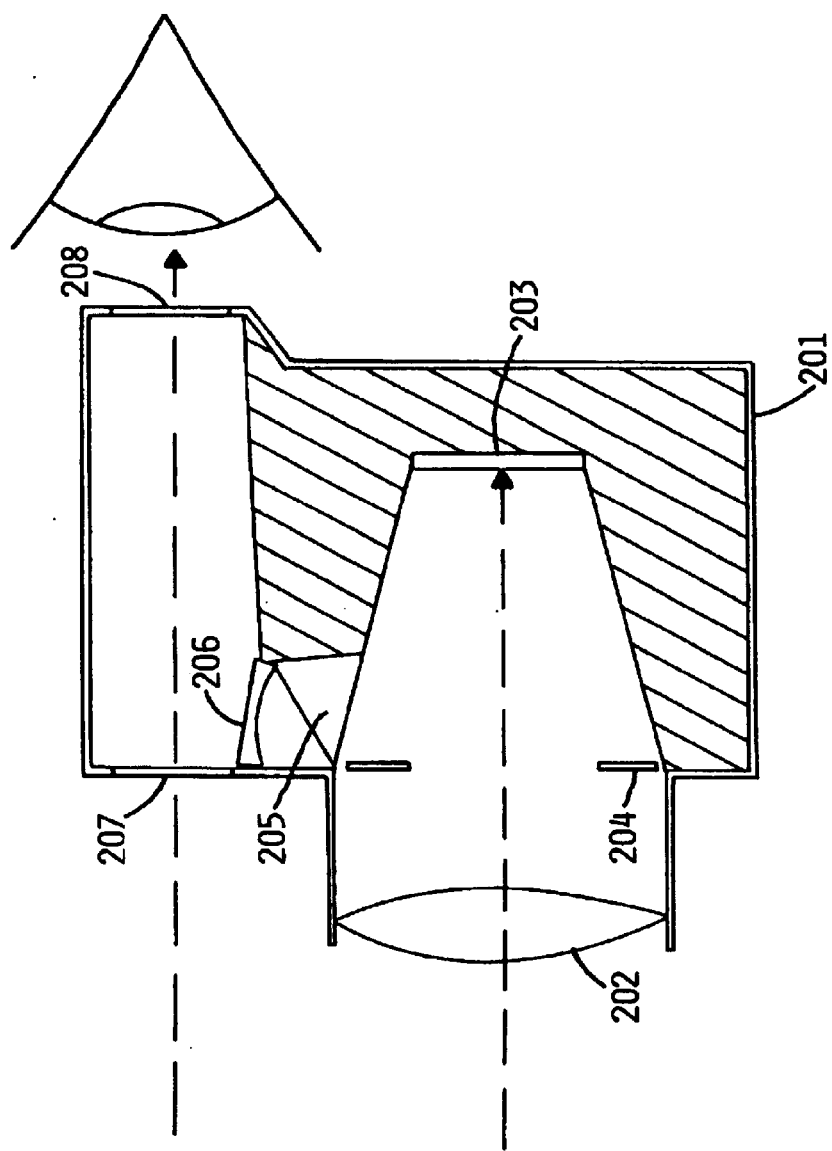
Figure 2B:
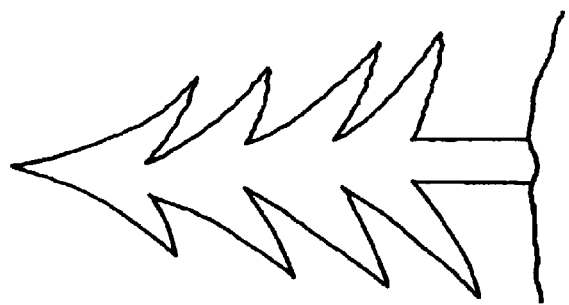

FIGS. 2A and 2B are sectional views representing different operational configurations of a digital camera according to a second embodiment. In this embodiment, a viewing window is separated from the image capturing portion of the camera, so that the photographer views the object of interest through a separate light path which does not pass through the photographing lens. Camera 200 comprises housing 201, lens 202, optical sensor array 203, and shutter 204. FIG. 2B shows a configuration of camera 200 during capture of a photograph. Shutter 204 is open, and light from the object of interest passes through lens 202 and registers on sensor array 203. Concurrently, the photographer may view the object of interest through a pair of viewing windows 207 and 208. During set-up of the photograph, the configuration is identical to that shown in FIG. 2B, except that shutter 204 is closed.

FIG. 2A shows a configuration of camera 200 during registration of the photographer's iris. At this time, shutter 204 is closed, and mirror 206 is pivoted upward, so that it blocks the transmission of light in a straight path through windows 207 and 208. Light from the photographer's iris passes through window 208, is deflected downward by mirror 206, is deflected again by prism 205, and registers on optical sensor array 203. Either prism 205 or mirror 206 may have curved surfaces for focusing the image of the iris on optical sensor array 203. It will be noted that in FIG. 2B, mirror 206 is pivoted downward, blocking the optical path between the viewing window area and the optical sensor array. As in the case of camera 100, it would be possible to add illuminators (not shown) to provide illumination of the iris, should background illumination be insufficient.

FIG. 3 is a sectional view of a digital camera according to a third embodiment. In this embodiment, there is no direct light path from the object of interest to the photographer; instead, a small display within the camera regenerates the image that is sensed by the optical sensor array, for display to the photographer. As shown in FIG. 3, camera 300 contains a housing 301, lens 302, optical sensor array 303, and shutter 304. Light from an object of interest passes through lens 302, which focuses it on sensor array 303. The detection electronics within the camera then cause the image detected by sensor array 303 to be displayed on display 308, which may be a liquid crystal or other appropriate display. The photographer views this display to determine what the camera is sensing and set up the photograph.

One-way mirror glass 306 mounted at an oblique angle to display 308 permits light from display 308 to pass through glass 306 and view window 309 to the photographer's eye. View window 309 may be a magnifying lens to enable easier viewing of display 308. However, light coming from the photographer's eye passes through view window 309, is reflected by mirror glass 306, passes through focusing lens 307 and is sensed by optical array 303. Therefore, to obtain an image of the photographer's iris, shutter 304 is closed. In this mode, display 308 may be activated to a white screen to provide illumination of the iris, or it may be shut off completely.

FIG. 4 is a sectional view of a digital camera according to a fourth embodiment. As in the previous embodiment, in this embodiment there is no direct light path from the object of interest to the photographer. A small display 408 within the camera regenerates the image that is sensed by the optical sensor array, for display to the photographer. As shown in FIG. 4, camera 400 contains a housing 401, lens 402, and optical sensor array 403. It may contain a shutter (not shown), or the equivalent function may be obtained by switching the optical sensor array on for a brief time electronically. Light from an object of interest passes through lens 402, which focuses it on sensor array 403. The detected image is then regenerated and displayed on display 408, which may be any appropriate display technology. The photographer views this display through view window 409.

As in the case of the third embodiment discussed above, one-way mirror glass 406 mounted at an oblique angle to display 408 permits light from display 408 to pass through glass 406 and view window 409 to the photographer's eye. Light coming from the photographer's eye passes through view window 409, is reflected by mirror glass 406, and passes through focusing lens 407. However, unlike the case of the third embodiment, in the fourth embodiment a separate optical sensor array 405 is used to sense the image of the photographer's iris. It will be appreciated that since the purpose of sensing the iris is to match data from the image with data from previously obtained images, sensor array 405 is not necessarily of the same high resolution as sensor array 403, and additionally may be monochromatic. When sensing the photographer's iris, display 408 may be activated to a white screen to provide illumination of the iris, or it may be shut off completely.

Figure 5:
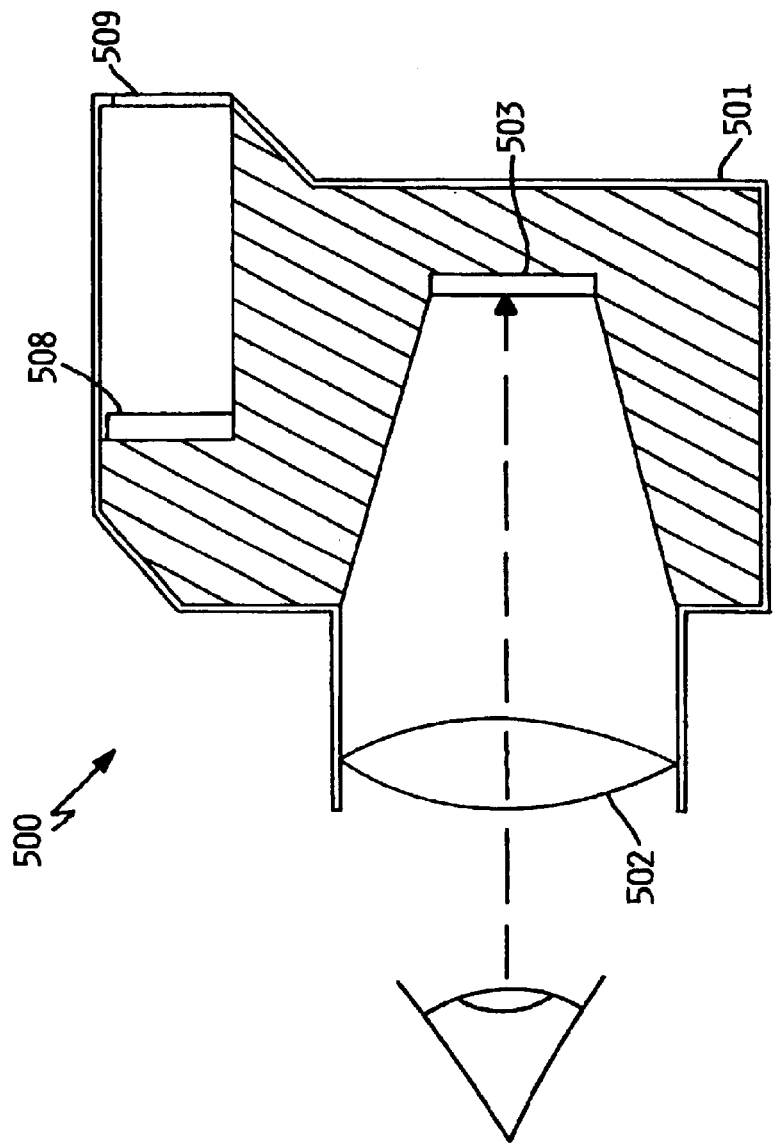
FIG. 5 is a sectional view representing a configuration of a digital camera according to a fifth embodiment of the present invention.

FIG. 5 is a sectional view of a digital camera according to a fifth embodiment. In this embodiment, the mechanical configuration of camera 500 is conventional, except possibly for the lens. Camera 500 contains a housing 501, lens 502, and optical sensor array 503. It may contain a shutter (not shown), or the equivalent function may be obtained by switching the optical sensor array on for a brief time electronically. In normal operational mode, light from an object of interest passes through lens 502, which focuses it on sensor array 503. The detected image is then regenerated and displayed on display 508, which may be any appropriate display technology. The photographer views this display through view window 509.

In order to capture an image of the photographer's iris, the photographer simply looks directly into lens 502, preferably before taking the picture. Because the photographer's iris is a rather small object, it is expected that the photographer will look into the lens from a very close distance. The lens must therefore be able to focus at this close distance to obtain an image of the iris. Close-up lenses are, of course, well known. A lens having a full range of focal lengths between the close distance and infinity may add unnecessary cost to the camera. Full range is not required however; it is merely required to be able to focus at a single, fixed close distance. This could be accomplished by a special lens setting or even an auxiliary lens member.

It will be understood that the representations in FIGS. 1–5 are intended as high-level representations for illustrative purposes, and are not intended as detailed drawings of all the components of a camera. Additionally, the components which are shown are represented in simplified form for ease of understanding. E.g., lenses 102, 202, 302, 402, 502 are often implemented as multi-piece elements having movable parts for adjusting the focal length.

It will be recognized that in at least some of the configurations shown above, and in other variations which may be conceived within the scope of the present invention, light from the photographers iris may strike the optical sensor array at an oblique angle or pass through prisms or similar optical media, any of which may distort the image which is captured by the optical sensor array. For example, the image may be elliptical rather than circular. The purpose of capturing an image of the iris is not to produce a true picture of the iris, but to match the captured image with data from a previously captured image stored in the database. Therefore, as long as the process is repeatable, the fact that it does not capture a true image of the photographer's iris is irrelevant.

Figure 6:
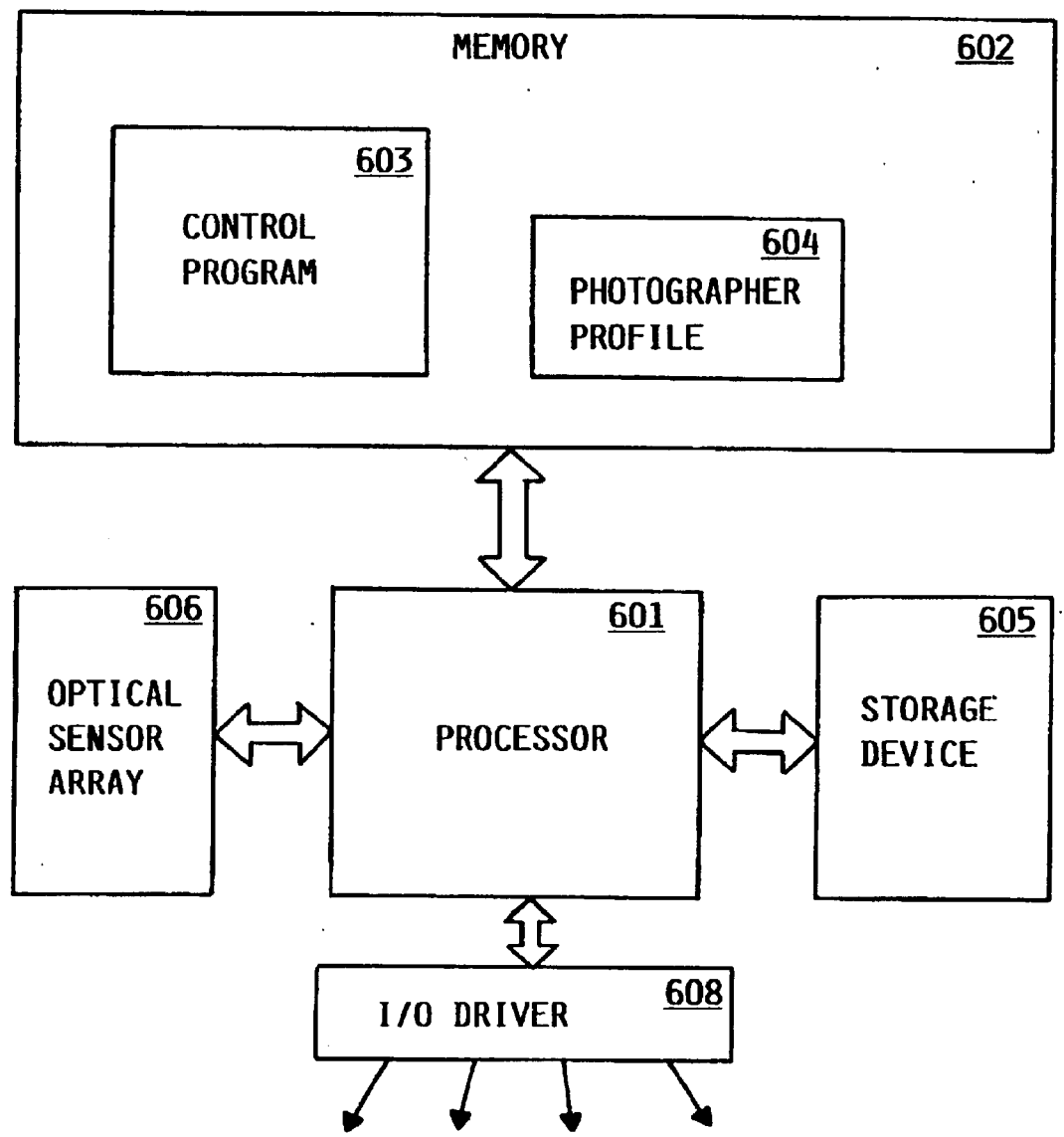
FIG. 6 is a illustrates the major electronic component of a digital camera, according to certain preferred embodiments of the present invention.

FIG. 6 is a high-level diagram illustrating the major electronic component of a digital camera, according to any of the above embodiments. The camera includes a programmable processor 601 in communication with a random access memory 602. Memory 602 contains a control program 603 comprising a plurality of processor executable instructions which, when executed on processor 601, control the operation of the camera. Memory further contains a photographer profile 604, as explained further herein. The camera further includes a data storage device 605 for storing digital images captured by the camera, optical sensor array 606 for capturing digital images, and I/O device driver/ controller 608 for communicating with various components of the camera, all of which are under the control of processor 601. Data storage device 605 may be any appropriate storage device used for storing digital images, such as semiconductor memory, magnetic tape, magnetic disk, optical memory, etc. The storage media may or may not be removable. I/O device driver controller 608 provides an interface to other camera components. These components include those controlled by processor 601, such as shutter, lens, mirrors, etc, as well as those from which processor 601 receives input, such as a shutter actuator button, or other user accessible buttons and switches. For some embodiments, these components will include a digital display device for displaying images to a user. Preferably, there is also a small status display, such as an LCD display, for displaying numbers, text and icons to inform the use of camera status. Additionally, there will usually be at least one external port for transmitting data to a device external to the camera, such as a computer, a television, a printer, etc. Power to the various electronic components is supplied by a battery (not shown).

Memory 602 preferably includes a portion which is strictly non-volatile, i.e., the data in the non-volatile portion is not lost in the event the memory receives no power, whether due to battery failure, replacement, or other event. Control program 603 and photographer profile 604 are preferably stored in this portion of memory. Specifically, it is preferred that photographer profile 604 be stored in a flash memory, which is non-volatile and allows data to be written a limited number of times. Memory 602 may also include a volatile or dynamic portion for storing temporary values, counters, etc., or for buffering image data.

In the preferred embodiment, photographer profile 604 contains a plurality of entries, each entry containing an iris scan summary, a photographer identifier, a photographer authority field, and an optional settings field. The iris scan summary is a digital record of multiple iris features, which is produced by obtaining a digital image of the iris and identifying and abstracting the various features of the iris from the image. Preferably, this iris scan summary is encoded into a record of approximately 512 bytes or less. Suitable iris recognition technology for high discrimination iris recognition in a high security context is available from, among others, Iridian™ Technologies. For purposes of the present invention, such a high discrimination capability is considered unnecessary, and it may be possible to reduce the number of features identified and the corresponding size of the iris scan summary. For example, the aforementioned Iridian™ Technologies iris recognition boasts a capability of recognizing 244 degrees of freedom, having odds of producing a false match as low as 1 in $10^{48}$. Such a capability may be desirable for guarding secrets of national importance, but it is overkill for purposes of the present invention. Typically, one would expect that ten or fewer individuals would be authorized to use a single camera. Furthermore, to discourage theft, it is enough to make it highly unlikely that the thief will be able to use the camera, and not necessarily to make the odds astronomical. It is believed that if the odds of a false match are 1 in 100 or less, such accuracy is sufficient for purposes of the present invention. This relaxing of the constraints makes incorporation of biometric capability as described herein more practical in the context of a camera. It not only reduces the amount of data which must be stored in the photographer profile, but it reduces the required accuracy of an image taken of the iris. This iris image may be at a fairly low resolution, or may be distorted, monochromatic, etc., and still fulfill the requirements of biometric identification described herein.

The photographer identifier field is preferably a text name, but a different form of identifier could be used. The photographer authority field defines the authority that the photographer has to use the camera. The following authority levels are defined:

Master: The photographer can perform all camera operations, including the alteration of the photographer profile record.

View: The photographer can both view existing recorded images and capture new ones, but can not change the photographer profile.

Record: The photographer can record new images, but can not view stored images or transmit them to another device.

None: The photographer is not allowed to perform any actions with the camera.

Where the storage device is a non-volatile removable device (such as a magnetic diskette), it may be impractical to prevent viewing an existing record, and in this case the "record" authority level would not be used.

One of the entries in the photographer profile is a default entry, which may be in a fixed location (e.g., the first location), or may have a known value in either its iris scan summary or the photographer name field which the control program recognizes as a default. The default entry is used to define the authority of a photographer who is not otherwise recognized, i.e., the authority of a photographer who has no corresponding entry for his iris in the photographer profile. Preferably, when the camera is initially shipped from the manufacturer, the default authority is set to "Master", allowing anyone to use all the camera functions. The purchaser may then alter the photographer profile by adding a scan of his own iris, giving himself master authority, and changing the default authority to a desired value. Preferably, the control program would prevent any change to the profile which would result in nobody having "Master" authority.

The optional settings field can be used to set the camera to one or more parameters preferred by the individual photographer. For example, some digital cameras enable a photographer to specify the resolution of the image saved in storage. A user could set the camera so that images taken by certain people (e.g., children) are at a low resolution to save memory, while images taken by others are at a higher resolution. Typically, the settings in the profile would only be initial settings, and the photographer would be able to override any stored settings for a particular photograph.

Text and similar data for the profile, or function selection, may be entered into the camera through any appropriate combination of buttons or other input means. Since such data is entered infrequently, it is not necessary that the camera contain a full function keyboard, as in common in the case of computers. For example, an arrow for scrolling through the alphabet, coupled with a select button, is sufficient.

Figure 7A:
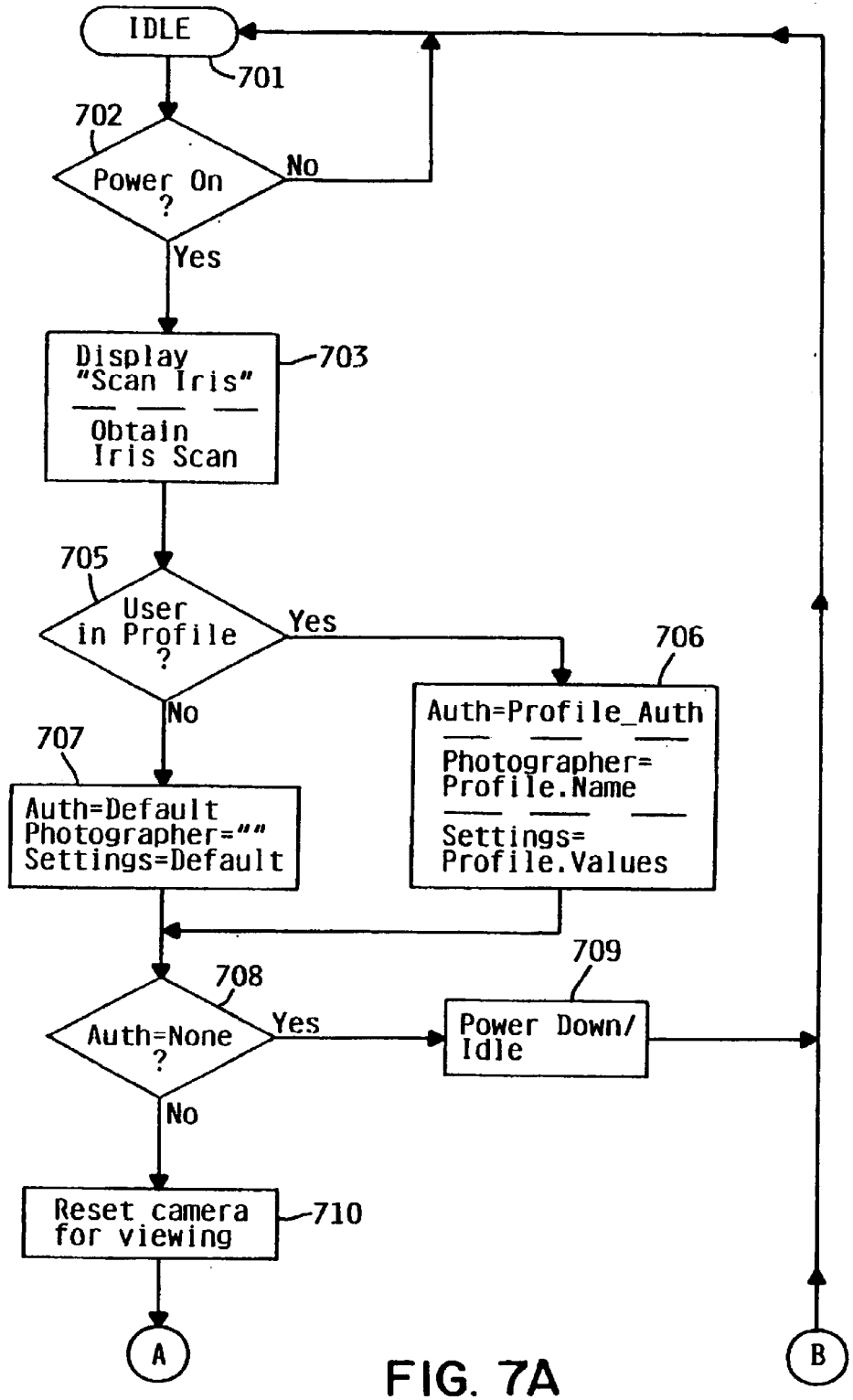
FIGS. 7A and 7B are a flowchart showing the operation of a camera control program at a high level, according to certain preferred embodiments of the present invention.
Figure 7B:
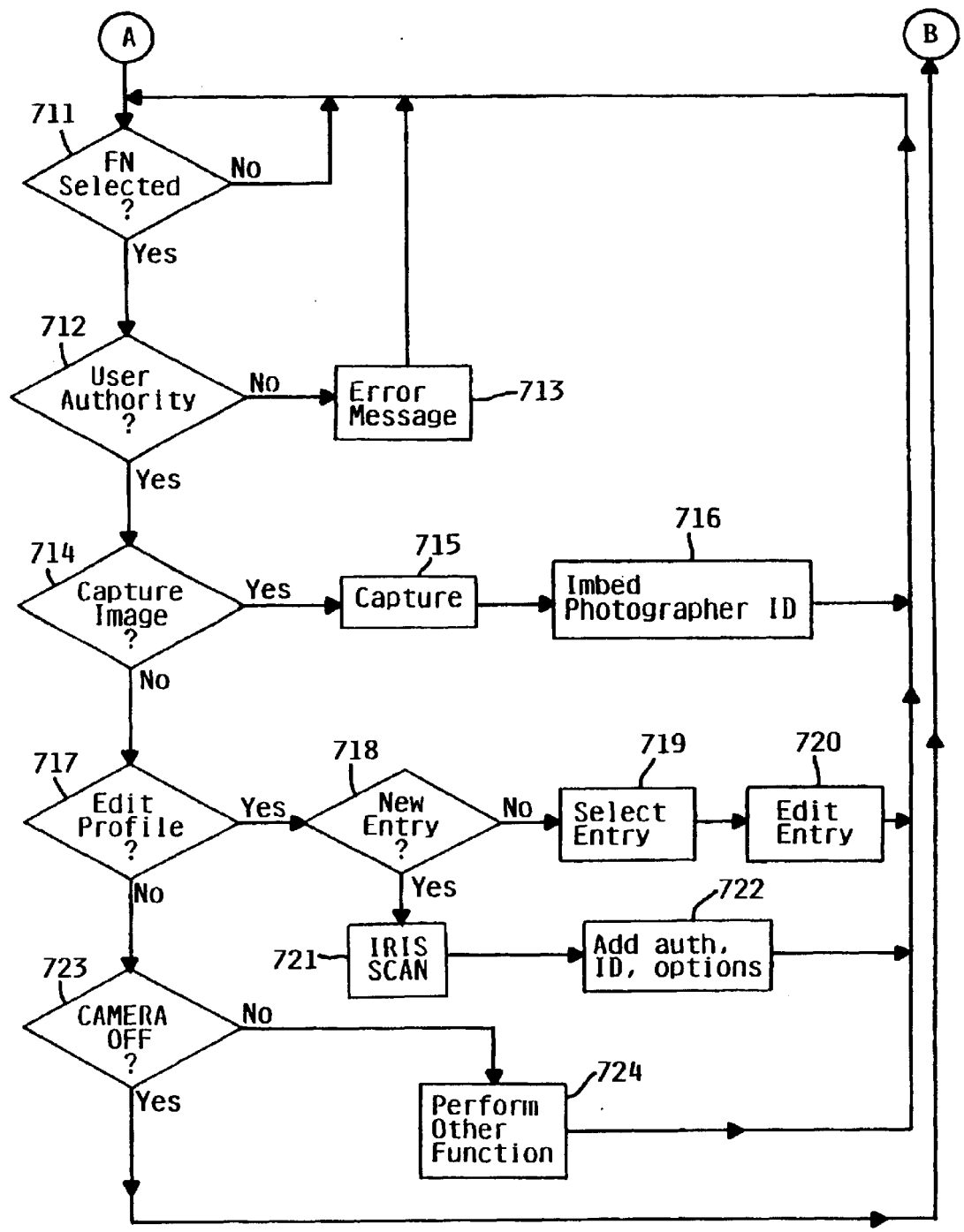

FIGS. 7A and 7B are a flowchart showing the operation at a high level of control program 603 of a camera according to any of the embodiments depicted in FIGS. 1–5. The camera is initially in an idle state 701. In the idle state, the control program periodically polls for a power-on indication, such as the user touching an appropriate button or opening a lens cover (step 702). When a power-on indication is detected, control program 603 displays "SCAN IRIS" or a similar message on the camera's data display, and simultaneously sets the camera to obtain the iris scan (step 703). As explained above, the camera configuration for obtaining the iris scan will vary with the particular embodiment. In the embodiment of FIGS. 1A–1C, for example, door 111 will be closed, deflecting mirror 105 will be rotated 90 degrees to deflect light from the view window backward to the sensor array, and illuminators 110 may be turned on. In the embodiment of FIGS. 2A–2B, shutter 204 will be closed and mirror 206 rotated upward. In the embodiment of FIG. 3, shutter 304 will be closed, and display 308 may be used as backlighting to provide illumination. In the embodiment of FIG. 4, display 408 may be used as backlighting again. And in the embodiment of FIG. 5, lens 502 will be set to a special close-up focus setting. Different camera configurations will require correspondingly appropriate camera settings. The control program then takes a scan of the iris and abstracts the appropriate iris features from the scan.

Control program 603 then compares the abstracted iris features just obtained with the stored iris features in the iris scan summary field of each entry in photographer profile 604 (step 705). If a match is found, the "Y" branch is taken from step 705. In this case, a user authority level is set to the authority value contained in the authority field of the corresponding entry in photographer profile 604, and the photographer is set to the value of the photographer identifier field (step 706). If the optional settings field is used, the camera settings are set to the values specified in the settings field of the photographer profile entry. If, on the other hand, no match is found at step 705, the "N" branch is taken, and the user authority level and settings are set to default values, while the photographer is set to a blank or null value (step 707).

Control program 403 then examines the user authority level (step 708). If the authority level is "None", the user is not authorized to use the camera, and the control program shuts down (step 709), returning to the idle state 701. If the authority level is something other than "None", the control program resets the camera for viewing and capturing images (step 710), i.e., the configuration of the camera is altered as necessary to view and capture images of objects of interest, as opposed to scanning a user's iris.

Control program 403 then waits for the user to select a camera function (step 711). A function could be to capture an image (take a still photograph or motion video), but could be many other things as well. Some functions may relate to preparation for the capture of a particular image, such as manually setting the aperture, focus, etc., while other functions may relate to matters unrelated to a particular image, such as setting a date/time indicator, uploading a collection of images in storage, etc. In particular, one of the functions available is to edit photographer profile 604.

When control program 603 detects a function selection (by, e.g., pressing an appropriate button or combination of buttons), the "Y" branch from step 711 is taken, and the control program first verifies whether the user has authority to perform the requested function (step 712). If the user lacks authority, an error message is displayed on the data display (713), and the control program returns to step 711. The camera may also make an appropriate audible error indication. If the user has authority, the "Y" branch is taken from step 712, and the requested function is performed. If the requested function is to capture an image (the "Y" branch from step 714), the control program causes the camera to capture the image. At approximately the same time, the identity of the photographer is imbedded in or associated with the image (step 716). This step may take different forms, and a single camera may support multiple options with regard thereto. In a simple form, the name of the photographer is superimposed on the image itself near the bottom or corner, just as it is common to superimpose a date or time on the image. Alternatively, the name of the photographer can be entered in a digital record which is associated with the image, so that it can subsequently be read by an appropriate device (such as a computer), even though the photographer's name is not directly superimposed on the image. This option gives a later viewer the ability to superimpose the name of the photographer or not, depending on preference, or to simply search for the name of the photographer in an on-line index or database of captured images. As a further alternative, the photographer identifier can be used to generate a digital signature which is associated with the image, and which would be difficult to alter using standard editing techniques. This could serve as evidence of authorship of digital photographs. After capturing the image and recording the photographer identifier, the control program returns to step 711.

If the requested function was to edit photographer profile 604 ("Y" branch from step 717), the control program prompts the user via the data display to choose an existing entry or a new entry (step 718). If the user chooses to edit an existing entry (the "N" branch from step 718), the user selects one of the existing entries, e.g., by cycling through the entries, a photographer ID being displayed on the data display for each respective entry, until the desired entry is found (step 719). The user then edits the entry, e.g., by changing the settings or the authority level, or by deleting the entry in its entirety (step 720). If the user chooses to create a new entry ("Y" branch from step 718), the camera sets up and performs an iris scan for the new entry as described previously, afterwards resetting itself to the normal viewing configuration (step 721). The user is then allowed to specify the photographer name, authority level, and optional settings associated with the new entry (step 722). In either case, the control program returns to step 711 after editing the photographer profile.

If the requested function was neither to capture an image nor to edit the photographer profile, the "N" branch is taken from step 717. In this case, if the requested function is to shut the camera off, the "Y" branch is taken from step 723 and the camera returns to idle state 701. In all other cases, the "N" branch is taken from step 723, and the camera performs the requested function (step 724), returning to step 711.

Since each person has two eyes, it would be possible to have two entries in the photographer profile for each individual, one entry corresponding to each eye. This is particularly recommended in the case of an individual having "Master" authority. E.g., in the event that the camera is somehow unable to recognize one of the irises, the individual's other iris may be scanned.

In the description above, various terminology and drawings have been used to imply that a camera according to the present invention takes still photographs. The camera configuration of FIGS. 1A–1C is intended for still photographs, but the other configurations are potentially applicable to either still or motion video. The present invention is generally applicable to motion video as well as still, and nothing herein should be interpreted as limited to still photographs unless expressly so stated.

In the preferred embodiment described above, the biometric capability of a camera is used both to make a record of the photographer, and as an anti-theft or privacy device. This implementation is chosen because, once the camera has biometric capability and a stored database of biometric profiles, the addition of multiple such functions adds little or nothing to the cost of the camera. However, it would alternatively be possible to provide only some subset of the functions described herein. For example, a camera with biometric capability might be used solely for identifying a photographer and authenticating photographs, without the anti-theft and privacy capabilities to verify the authority of a user.

In the preferred embodiment described above, the biometric parameter used to identify the photographer is an iris scan. An iris scan has the advantage of being obtained optically, and thus using some or all of the same electronics which are used for image capturing in the camera. However, it will be appreciated that alternative biometrics could be used. For example, a retina scan could be used, although this typically requires a laser scanner. As another alternative, a scan of facial features is possible. The scan of facial features is more complex than a retina scan and, using today's technology, is probably less reliable and less repeatable. However, it does have the advantage that a much larger feature is being scanned. In the camera embodiment of FIG. 5, this would probably mean that no special modification of the lens would be required.

As a further alternative, it should be recognized that the biometric would not necessarily have to be optically obtained. For example, voice recognition technology has been used to identify individuals. Already, many digital cameras (and particularly motion video cameras) are equipped with microphones. The photographer may be prompted to speak a short phrase (such as the photographer's name), and the processor would match the digitized audio input with a previously stored voice print of the photographer. As an additional alternative biometric measurement, it is noted that gun manufacturers and others are currently experimenting with fingerprint sensors which would identify an individual from his fingers. This technology is currently primitive, but in the future might be used as a biometric identifier.

Although a specific embodiment of the invention has been disclosed along with certain alternatives, it will be recognized by those skilled in the art that additional variations in form and detail may be made within the scope of the following claims:

What is claimed is:

1. A digital camera, comprising:
   a housing;

a digital optical sensing apparatus mounted within said housing, said digital optical sensing apparatus sensing optical images;

a first optical member focusing light representing a biometric parameter of a user of said digital camera for capture by said digital optical sensing apparatus, said light representing a biometric parameter of a user traversing a first light path through said camera from said first optical member to said digital optical sensing apparatus;

a second optical member focusing light from images of interest to be captured by said digital optical sensing apparatus, said light from images of interest to be captured traversing a second light path through said camera from said second optical member to said digital optical sensing apparatus, said second light path not being coincident in any segment with any segment of said first light path, said second light path encountering said digital optical sensing apparatus at a non-zero angle with respect to said first light path;

a processor for controlling operation of said digital camera, said processor operating said digital camera in at least two modes of operation, including:

(a) a first mode of operation, wherein said digital optical sensing apparatus senses a biometric parameter of a user of said camera, said processor identifying said user from said biometric parameter; and (b) a second mode of operation, wherein said digital optical sensing apparatus captures and records an image of an object of interest.

2. The digital camera of claim 1, wherein said biometric parameter is an iris of said user's eye.

3. The digital camera of claim 1, further comprising a viewing window for viewing an image of said object of interest by said user;

wherein, in said first mode of operation, said digital optical sensing apparatus senses light representing said biometric parameter, said light entering said camera through said viewing window.

4. The digital camera of claim 1, wherein said processor further associates user identifying data with a recorded image of an object of interest, said user identifying data being obtained using said biometric parameter.

5. The digital camera of claim 1, wherein said processor further selectively enables at least one camera function responsive to identifying said user from said biometric parameter.

6. The digital camera of claim 1, further comprising:

a memory, said memory for storing biometric parameters associated with a plurality of potential users of said digital camera;

wherein said processor identifies each user of said plurality of potential users of said camera by comparing a biometric parameter obtained from said digital optical sensing apparatus with said biometric parameters associated with said plurality of potential users in said memory, and, responsive to identifying a user, associates respective user identifying information with each digital image of an object of interest captured by said digital optical sensing apparatus.

7. The digital camera of claim 6, wherein said processor further associates at least one camera operating parameter value with each of a plurality of users, and wherein said processor, responsive to identifying said user from said biometric parameter, automatically sets said at least one camera operating parameter to the value corresponding to the identified user.

* * * * *